United States Patent [19]
Rahamim et al.

[11] Patent Number: 5,315,651
[45] Date of Patent: May 24, 1994

[54] ACTIVE SURGE REJECTION CIRCUIT

[75] Inventors: Raphael Rahamim, Orange; Dale E. Folwell, Placentia, both of Calif.

[73] Assignee: Rockwell International Corporation, Seal Beach, Calif.

[21] Appl. No.: 895,969

[22] Filed: Jun. 9, 1993

[51] Int. Cl.$^5$ .............. H02H 3/00; H02H 3/22; H02H 9/04; H04M 9/00
[52] U.S. Cl. .................. 379/412; 379/399; 361/56; 361/91; 361/111; 375/8
[58] Field of Search ............ 379/412, 410, 38, 98, 379/100, 145, 442; 361/56, 91, 111; 375/8

[56] References Cited
U.S. PATENT DOCUMENTS

| | | | |
|---|---|---|---|
| 4,079,211 | 3/1978 | Janssen | 379/412 |
| 4,398,066 | 8/1983 | Sinberg | 379/412 |
| 4,433,212 | 2/1984 | Moses et al. | 379/412 |
| 4,465,903 | 8/1984 | Barber | 379/442 |
| 4,718,084 | 1/1988 | Dragotin | 379/412 |
| 5,130,883 | 7/1992 | Edwards | 361/91 |
| 5,208,718 | 5/1993 | Fox | 361/111 |

OTHER PUBLICATIONS

"Radio Shack New 1974-75 Dictionary of Electronics" Rudolf F. Graf pp. 28, 145, 155,373,374, and 687.

Primary Examiner—James L. Dwyer
Assistant Examiner—Scott L. Weaver
Attorney, Agent, or Firm—H. Fredrick Hamann; George A. Montanye; Tom Streeter

[57] ABSTRACT

The ACTIVE SURGE REJECTION CIRCUIT uses a FET connected in one of the TIP and RING leads to open and close the lead. A JK flip-flop is connected to a voltage sensing circuit which senses voltage surges and clocks the flip-flop early in the voltage rise. This activates a first circuit to ground the FET gate and hold the FET open. Meanwhile, a second circuit comprising an RC circuit charges a capacitor which maintains the FET in its OFF condition for a period of time longer than the surge, i.e., about 1 m sec, and then clears the JK flip-flop after the capacitor has discharged a predetermined amount. This invention thus provides surge (non-common mode) protection, and is especially useful in protecting modems from voltage surges while minimizing signal distortion during non-surge conditions.

13 Claims, 6 Drawing Sheets

ACTIVE SURGE REJECTION CIRCUIT

BACKGROUND OF THE INVENTION

This application is related to simultaneously filed U.S. application, Ser. No. 07/895,968, filed Jun. 9, 1992, entitled MODEM WITH DIGITAL ISOLATION by the same inventors, assigned to a common assignee.

FIELD OF THE INVENTION

The invention disengages electronic devices, including modems, from the power source and/or telephone line system when sensing high level, fast rising surges.

PRIOR ART

In the prior art of the Data Access Arrangement (DAA), which interfaces between the telephone lines and the modem, employs an isolation transformer which is too large and heavy for the new "credit card" minimal size modem cards.

Just as data speeds are growing, modem size is decreasing. Modems are becoming an integral part of all LapTop/PalmTop computers. Because these computers are small, size and weight are at a premium. With the growing data rates, minimum distortion is a must. Distortion is the limiting factor for high speed modems.

While the DAA isolation transformer protects the electronic circuits, it also introduces distortion, consumes real estate and is the heaviest part of the modem section. In the case of portable computers, minimum weight is a priority requirement.

Some modems have eliminated the DAA isolation transformer by using analog optical isolation. However, distortion, cost and complexity remain the real problems.

Modems are very cost contemplative and the circuitry must not only be small but also the basic design must be compatible or adaptable to the current integrated circuit technology.

By eliminating the transformer and the distortion that comes with it, an increase in the data rate capabilities of the modem is realized. Size, weight and cost are also reduced significantly.

Although significant strides in improving performance and reducing the size of modems has been made, the DAA interface circuitry has remained relatively unchanged. In fact, on some of the lap top designs, the DAA occupies almost as much room as the remainder of the modem circuitry.

So far, designers have been able to stay within the packaging constraints by squeezing the parts closer together. However, designers are quickly reaching limits as they are now experiencing problems in meeting the UL and Part 68 high voltage breakdown test. In addition, the physical size of the DAA components prevents the installation of a modem in the new pocket computers.

One of the largest components in the DAA is the transformer. Functionally the transformer satisfies two design requirements.

First it provides the necessary high voltage isolation between the telephone network and the user. In the United States, this is specified by FCC part 68 which requires 1500 volts. In other countries this isolation may be up to 3750 volts.

Second it provides the balance interface circuit necessary to meet Part 68, as well as providing good common mode rejection of the noise signals normally on the telco lines.

To support both of these requirements and still maintain a very low distortion level results in a relatively large transformer. For example, the new high performance modems, like v.32, require distortion levels of −70 dBm or lower. To achieve these levels require special magnetic material and large physical size.

Based on these problems, it is clear that there needs to be an alternate to the isolation transformer.

Experience indicates that when one attempts to add isolation circuitry in the analog circuit path, there will always be the problem of adding distortion.

SUMMARY OF THE INVENTION

The invention eliminates surge problems when the large isolation transformer is removed.

The modem must pass a metallic voltage surge test which is a pulse of 800 volts applied between the TIP and RING of the modem. While the modem is at the ON-HOOK state, there is no problem because the seizure relay is off (open), and thus, prevents the surge from getting into the electronic circuits. This 800 volt surge is also applied while the modem is in the OFF-HOOK state, at which time the line switch is closed and the 800 volts can cause an irreversible damage to our electronic circuits.

A FET is connected in one of the TIP and RING leads to open and close the lead. A JK flip-flop is connected to a voltage sensing circuit which senses voltage surges and clocks the flip-flop early in the voltage rise. This activates a first circuit to ground the FET gate and hold the FET open. Meanwhile an RC circuit charges a capacitor which maintains the FET in its OFF condition for a period of time longer than the surge, i.e., about 1 m sec, and then clears the JK flip-flop after the capacitor has discharged a predetermined amount.

A synergistic result is obtained if the above invention is combined with a transformerless DAA circuit which uses pulse transformers and multiplexers/demultiplexers or optical or other isolation at the digital interface (rather than in the analog DAA) between the Integrated Analog and the Digital Signal Processor for isolation, resulting in minimal analog distortion, and higher data rates because both common mode and non-common mode protection is obtained. The elimination of the heavy conventional isolation transformer is particularly helpful in cards for LapTop/PalmTop computers.

The present invention can provide surge protection/rejection as a stand alone circuit. In other words, while it complements the DIGITAL ISOLATION, it can serve other applications just as well.

DESCRIPTION OF THE PREFERRED EMBODIMENT

Figure 1:
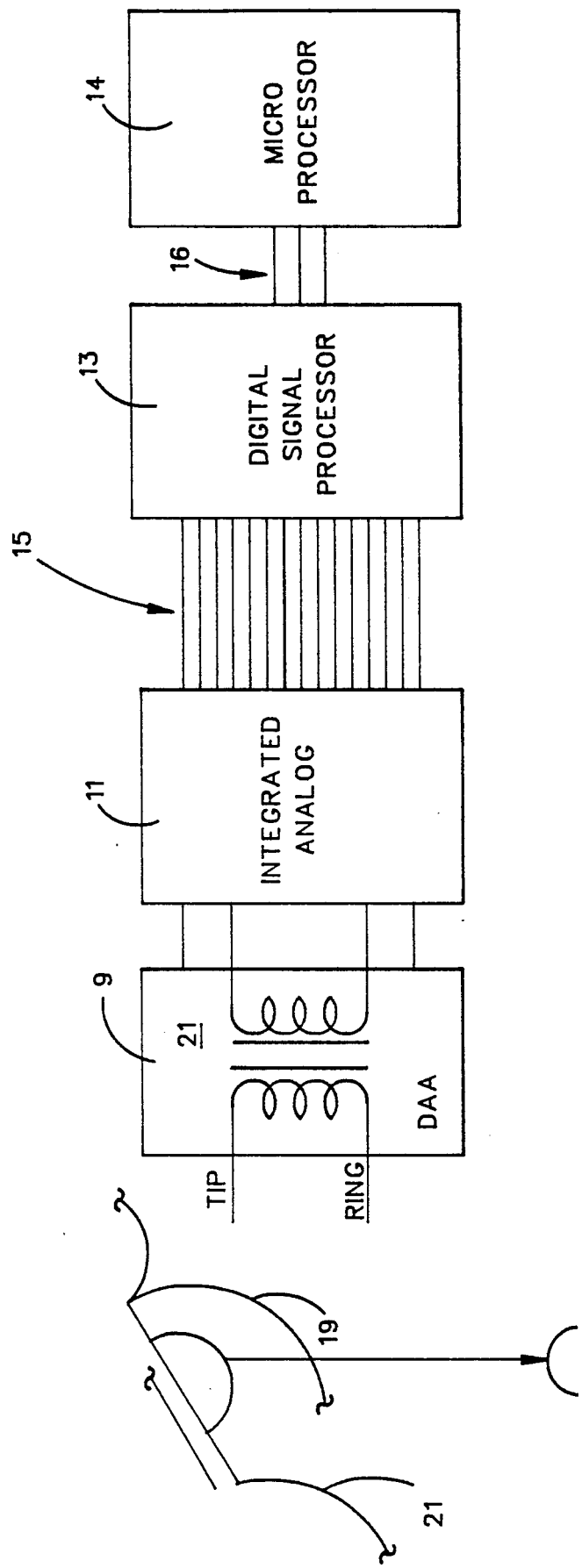
FIG. 1 is a block diagram of a prior art modem.

Currently, the Rockwell modem Integrated Analog (IA) device 11 (FIG. 1) and the Digital Signal Processor 13 (DSP) are connected by 15 individual wires 15, with the micro processor 14 being connected to DSP 13 by two wires 16. All Data Access Arrangement (DAA) devices 9 (FIG. 1) require a high voltage isolation between the telephone lines 19, 21 and a modem. Usually transformer 21 (in the DAA section) provides this isolation.

Figure 7:
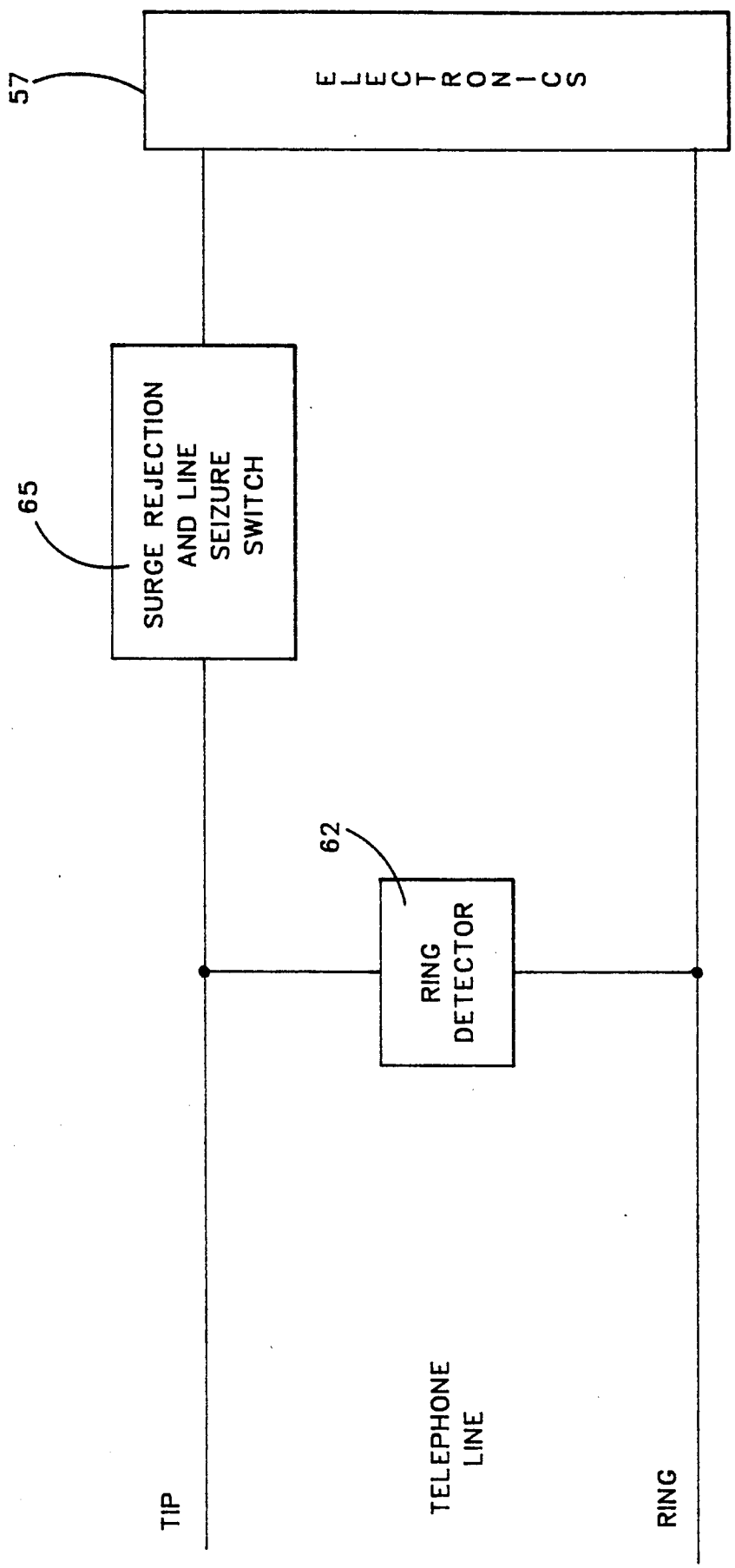
FIG. 7 shows the surge protection circuit of this invention in the absence of an isolation transformer; and, FIG. 8 is a circuit diagram of a transformerless DAA circuit with surge protection.
Figure 8:
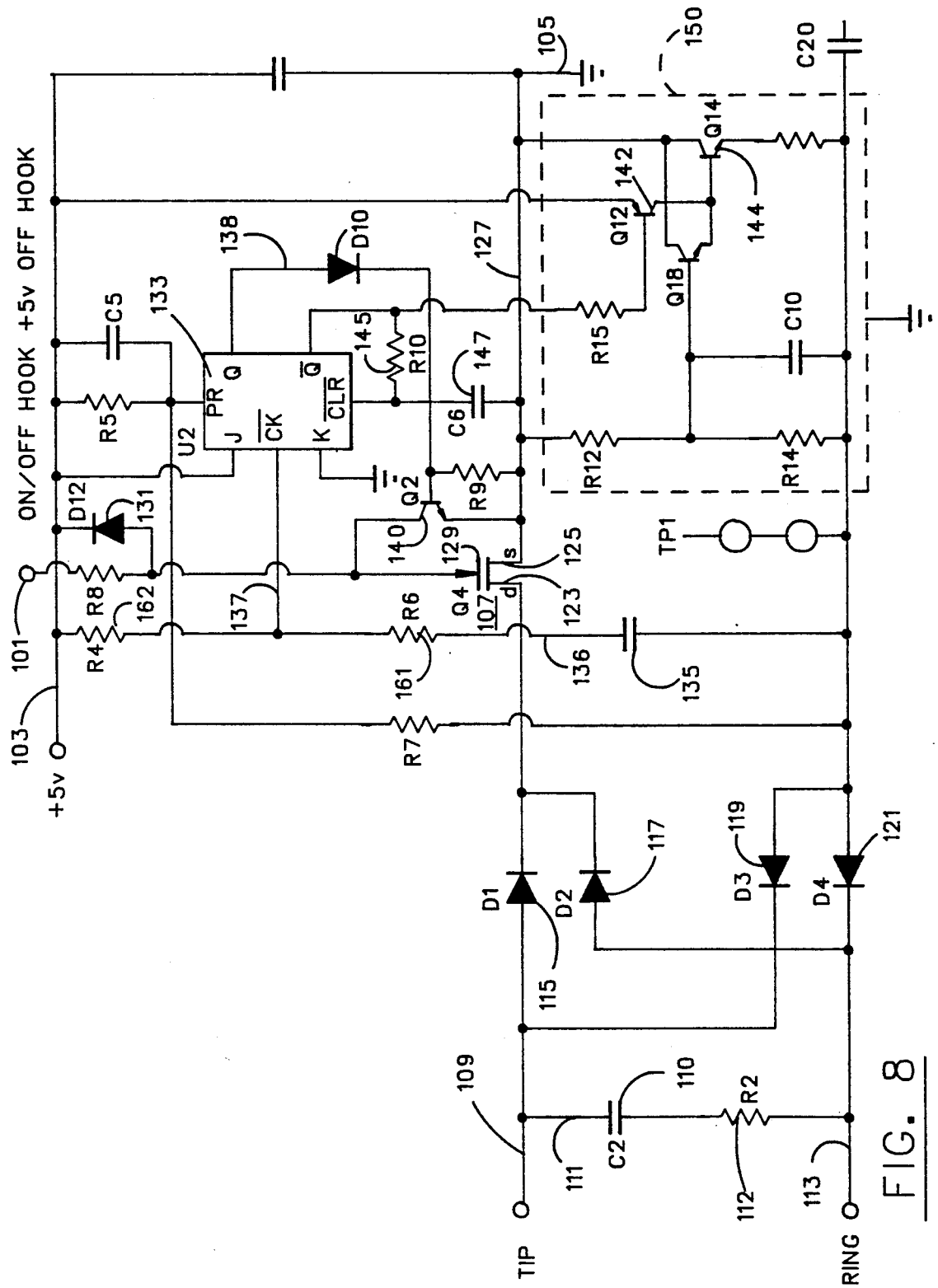

FIGS. 2, 4, 4A, 5 and 5A detail the cross-referenced invention which eliminates the conventional isolation transformer from the DAA and provides a synergistic combination with the present invention, which is best seen in FIGS. 7 and 8.

Figure 2:
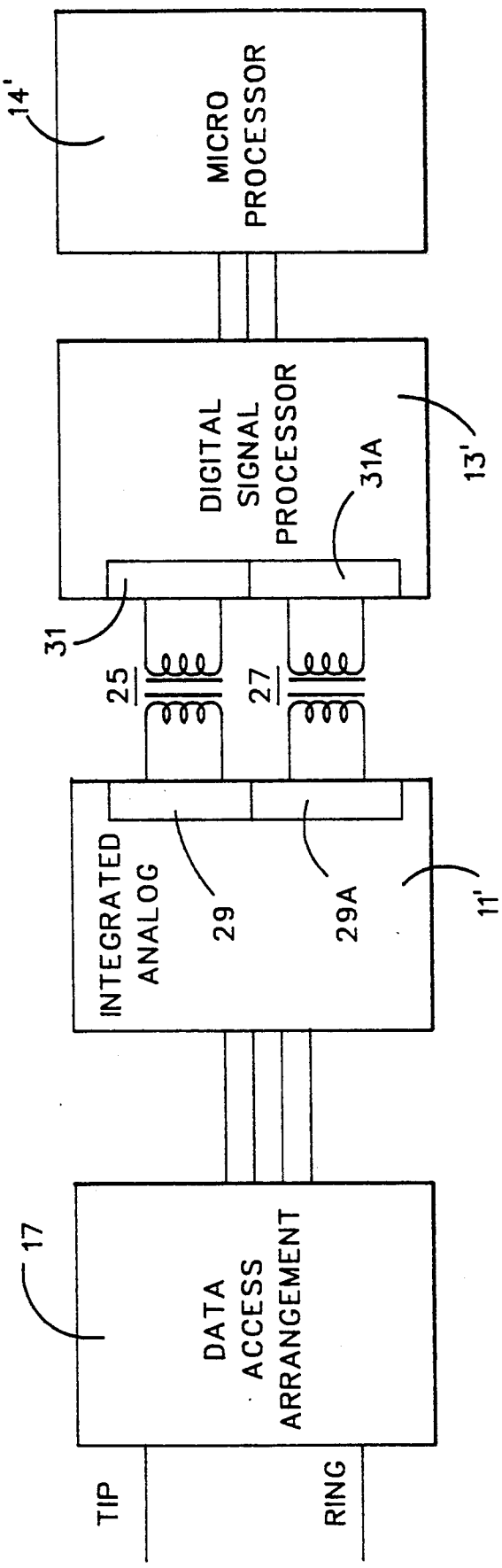
FIG. 2 is a block diagram of a modem with a transformerless DAA.

In FIG. 2, the isolation transformer 21 has been eliminated and, instead, tiny pulsed transformers 25, 27 are used between the IA device 11' and the DSP 13'. The received integrated analog signal is digitized, and then multiplexed in box 29 and demultiplexed in box 31, whereas the transmitted signal is multiplexed in Box 31A and demultiplexed in box 29A, thus avoiding the 15 wire interconnection and all analog distortion.

Thus, it may be seen that the parallel signals on these leads (15) are combined into two serial data streams, one input and one output. The data is encoded in a time division multiplex, self clocking arrangement. All serial encoding and decoding is incorporated into the Integrated Analog and Digital Signal Processing devices 11' and 13', so that the isolation circuitry may consist only of two pulse transformers 25, 27 or two opto couplers (not shown).

Figure 4:
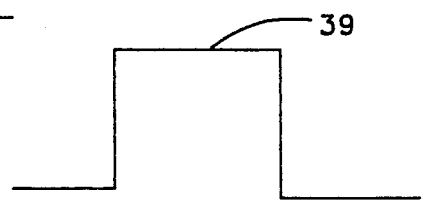
FIG. 4 shows a typical square wave.
Figure 4A:
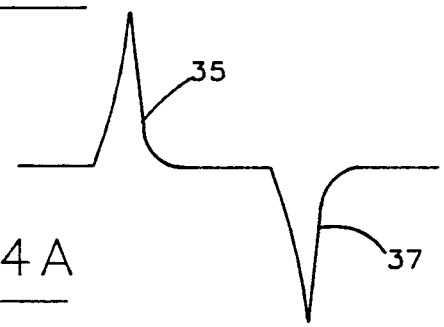
FIG. 4A shows the wave differentiated to save power.

Also, pulsed signals save power. It is only necessary to pass short spikes 35, 37 (FIG. 4A), representing up and down transitions of original wave 39, rather than to pass the full wave 39 (FIG. 4). Common mode rejection, as well as, high voltage isolation are attained by the pulse transformers.

Figure 5A:
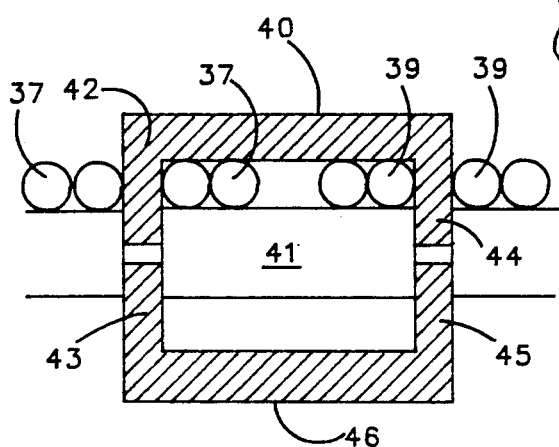
FIG. 5A is a view in cross section of a pulse transformer.
Figure 5:
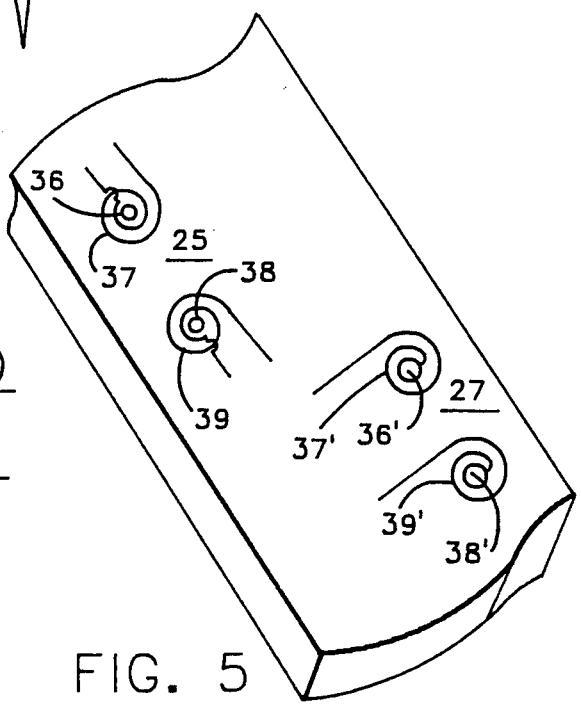
FIG. 5 shows coils for a pulse transformer in lieu of the conventional isolation transformer.

FIGS. 5 and 7 show the construction of the pulse transformers 25 and 27 on conventional glass pc board 41 of, e.g., 0.062" thick. Center holes 36, 38 in the board, receive the legs 42, 43 and 44, 45 of U-bars 40, 46 to form the "gaps" where they abut. The coils 37, 39 surrounding the respective legs comprise only a few turns of metal, laid down on the board 41, and etched away to leave the coils, which may have diameters of about $\frac{1}{4}$ inch. The U-bars are about $\frac{1}{2}$ inch in length. The other pulse transformer 27 is spaced away from transformer 25 as far as practical, and the components are the same, bearing the primes of the same numbers. The best magnetic materials are employed for the magnetic path, such as ferrite, and the small dimensions easily fit space minimums.

The frequency of operation is in the megacycle range, and the power losses are extremely low because the pulse technique requires much less power than handling the entire wave. The pulse technique also handles common mode distortion problems.

In lieu of the preferred pulse transformers at the digital interface, other types of isolation may be used. Two opto couplers are also effective on two serial data streams, i.e. one input and one output, but the pulse transformer isolation uses less power.

Figure 3:
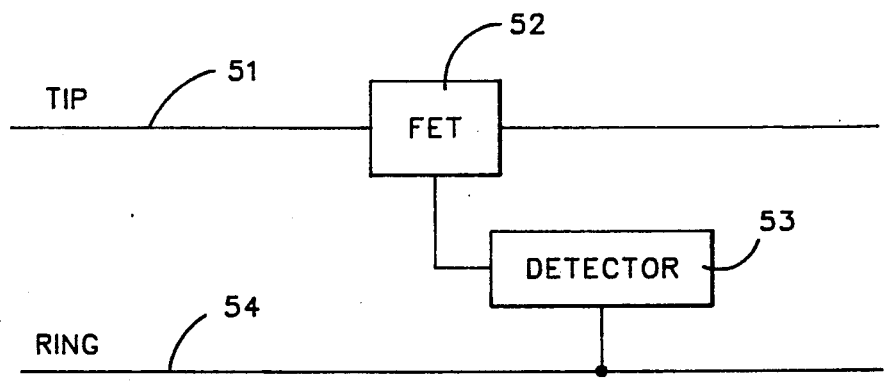
FIG. 3 shows the surge detector and a line FET.

For non-common mode, e.g., lightning caused surges, i.e., in above ground telephone systems, the block diagrams of FIGS. 3 and 7 show surge rejection circuits for use in DAA device 17 of FIG. 2. In FIG. 3, TIP line 51 includes FET 52 (or a fast acting transistor) to open this line. DETECTOR 53 between TIP lead 51 and RING lead 54, senses the surge and very quickly opens FET 52.

Figure 6:
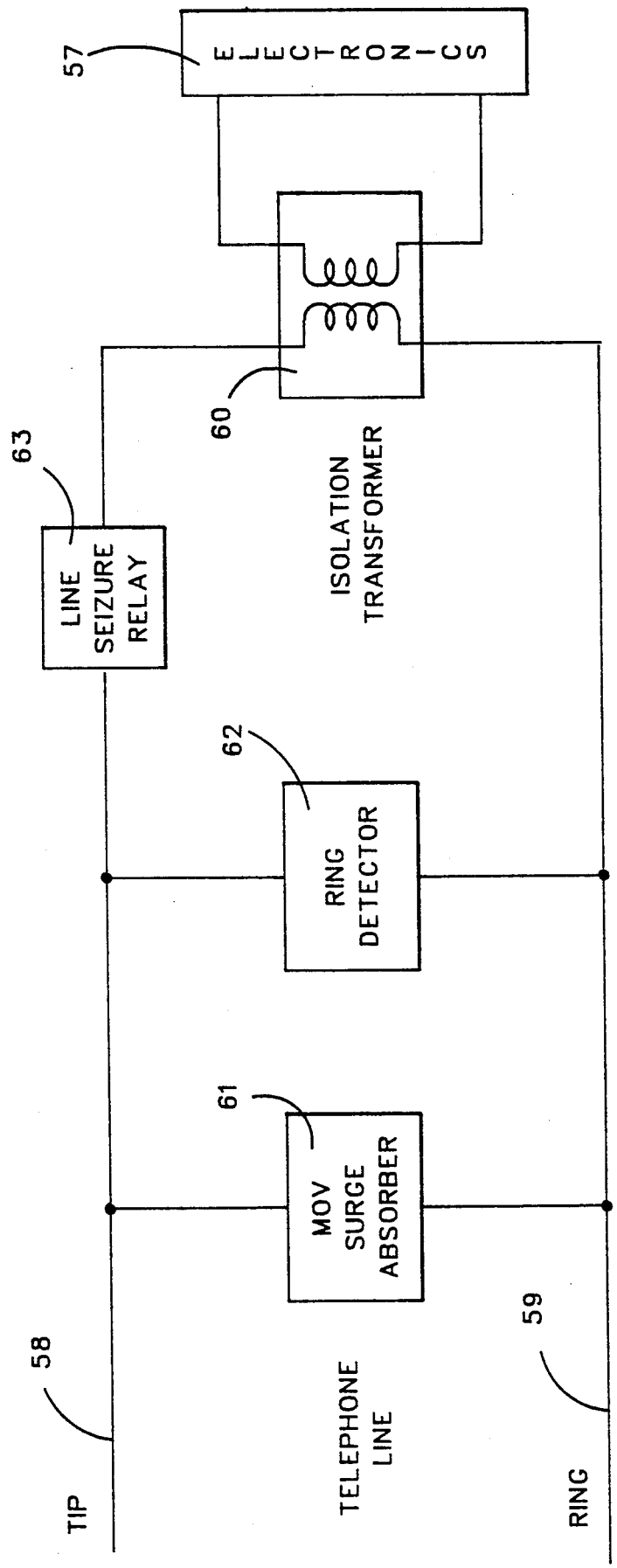
FIG. 6 shows a block diagram of a prior art surge protection circuit being used when the isolation transformer is present.

FIG. 6 shows PRIOR ART type surge protection for modems, e.g., 57 coupled to telephone lines 58, 59. The conventional isolation transformer 60 is shown connected between the telephone lines 58, 59 and the modem 57. MOV 61 (metal oxide varistor) is shown connected across the lines to act as a surge absorber. RING DETECTOR 62 is provided to indicate to modem 57 that a ring has appeared and the DSP 13, via IA11, operates LINE SEIZURE RELAY 63.

FIG. 7 shows a preferred surge protection circuit of this invention in the absence of isolation transformer 60. The details of this SURGE REJECTION and LINE SEIZURE SWITCH 65 are set forth in FIG. 8.

In FIG. 8, the ON and OFF Hook lead is shown at 101, supplying +5 volts in OFF HOOK, and the D.C. power lead 103 receives +5 volts above ground 105 when the MODEM is on. FET 107 (BUZ 78) serves to open and close TIP lead in the signalling circuit for unexpected surges.

Capacitor 110 in parallel lead 111, including series resistor 112 across TIP lead 109 and RING lead 113, is a 0.33 μf, 250 volt capacitor and resistor 112 is 10,000 ohms. The pair comprise a dummy load for the RING signal.

Next, a full wave bridge rectifier comprises the four 1N4006 diodes 115, 117, 119 and 121 to insure positive voltage on the drain 123 of FET 107, source 125 being grounded at 105 over lead 127.

The circuit of FIG. 8 must provide protection under a variety of circumstances:

1) The modem's power is OFF at 103.

At this time the FET 107 (Q4) is already in the OFF state. While in the OFF state, the FET will block high voltage from going through. When the fast rising surge arrives, it attempts to charge the FET gate 129 through the internal capacitance of the FET 107. Normally, this will cause the FET to turn ON. However, diode (1N1148) D12 131 keeps the FET 107 OFF by clamping the gate 129 to ground 105 via the 5 v power supply, thus, preventing any charge build-up on the gate 129.

2) The modem's power is ON at 103 and it's ON-Hook at 101. This case is similar to the previous one in the sense that the FET 107 is still OFF and no DC current is running through it. The FET is OFF because the ON-Hook signal coming through lead 101 keeps the gate 129 at ground level 105. At this time, the JK flip-flop 133 (U2) (74HC112) is powered from lead 103 and can assist in keeping the FET 107 OFF.

When the surge arrives it will pass through C4, shown at 135 (100 pf) and becomes a clock to the JK flip-flop 133. Resistor R6, shown at 161, has 47,000 ohms and resistor R4, shown at 162 has 10,000 ohms. This 5:1 ratio determines the extent of the surge voltage necessary to clock JK flip-flop 133 over lead 137, and it can be made adjustable, if desired. As a result the Q output of the JK 133 will go up and turn Q2 140 (2N2222) ON over leads 138 and 127. Q2 140 will hold the gate 129 of Q4 140 clamped to ground level, which results in keeping the FET 107 at the OFF state.

3) The modem's power is ON at 103 and it's OFF-Hook at 101. This time around, the FET 107 is conducting line current because its gate receives 5 v from the lead 101. The surge will, again, go through C4 135 and clock the JK 133. The Q output of JK will go up and cause Q2 140 to turn ON. Q2 140 will turn the FET 107 OFF as soon as possible before the voltage builds up.

4) The modem's power is ON at 103 and it's OFF-Hook at 101 but no current flows through TIP and RING.

This time the circuit performs the same way as in the last case. This situation is not likely to happen during normal use of the modem, but FCC labs do test the modem powered ON with no TIP and RING current.

In support of the above activities, Q12 142 (2N4403) turns ON any time the JK flip-flop 133 gets clocked and will turn Q14 144 (MJD 47) ON very fast. This action discharges the stray capacitance and the FET's 107 capacitance, preventing a voltage build-up.

R10 145 (47K) and C6 147 (0.01 µf) hold the Q output of the JK flip-flop 133 at a high level which keeps the FET 107 OFF for about 1 mSec. This way the FET 107 is turned OFF for a period longer than the expected duration of the surge. In case the surge persists beyond (1 MS) the R7 and R5 C5 combination was designed to keep the JK at the clocked state which in turn keeps Q4 107 off.

It should be noted that, for AC purposes, ground 105 is connected to +5 volt lead 103, so a high potential spike or surge across TIP-RING causes the negative side of the pulse to pass via any of several paths in the electronic inductor box 150 up to ground 105 and to lead 103. Thus, the pulse is across the 5:1 voltage divider, R4 162, R6 161.

Also, when FET 107 is going from ON to OFF, there is still some energy passed through it, and voltage builds up across Q14, 144. After the clock, transistor Q12 142 turns on hard by Q bar, Q going up and Q14 144 is then turned on hard, absorbing the energy.

The surge protective circuit can work in any circuit or modem to protect, e.g., consumer products from non-common mode surges. Thus, the combination of the transformerless DAA with digital pulse transformers and the surge protection circuit precludes both non-common mode and common mode problems.

What is claimed is:

1. A modem surge protection circuit, comprising in combination:
   (a) TIP and RING leads for communication between a telephone line and a modem;
   (b) a FET connected to open and close one of said leads;
   (c) an ON/OFF HOOK circuit for supplying operating voltage to said FET when line is in an OFF HOOK mode;
   (d) a modem power source for dc voltage which is positive relative to ground;
   (e) a first sub-circuit and a second sub-circuit;
   (f) a flip-flop for activating said first sub-circuit in one condition and said second sub-circuit in its other condition;
   (g) sensing means connected across said leads for activating said flip-flop to said one condition upon sensing a surge voltage;
   (h) said first sub-circuit preventing said FET from conducting current when said first sub-circuit is activated; and
   (i) said second sub-circuit resetting the flip-flop after a predetermined time.

2. The circuit of claim 1, wherein:
   said first sub-circuit comprises clamp means for clamping the gate of said FET to ground in response to a surge to prevent charge build-up on the gate.

3. The circuit of claim 2, further comprising a first transistor connected to said flip-flop to saturate when the flip-flop is clocked;
   a second transistor connected to the first transistor to turn on rapidly by the first transistor conducting; and,
   a shorting pathway closed by said first and second transistors from RING lead to ground to discharge stray capacitance including FET capacitance.

4. The circuit of claim 3, further comprising:
   a rectifier bridge circuit connected between the TIP and RING leads to insure positive voltage to the drain of the FET.

5. The circuit of claim 4, further comprising:
   a resistor-capacitor series circuit connected across the TIP and RING lead to serve as a dummy load for a RING signal.

6. The circuit of claim 1, wherein:
   said sensing means comprises a series circuit consisting of a capacitor and two resistors with a common point to both resistors being connected to a clock input of said flip-flop, the relative values of said resistors determining the point on the surge which activates the flip-flop.

7. The circuit of claim 1 wherein:
   said first sub-circuit comprises a clamping transistor connected to Q bar output of the flip-flop and being connected across the source-gate of said FET to ground the gate when the flip-flop is clocked.

8. The circuit of claim 1, wherein:
   said second sub-circuit comprises a resistor-capacitor network connected to flip-flop output Q bar for charging a capacitor, and connected to flip-flop CLEAR for discharging when the flip-flop is clocked to maintain the gate grounding of the FET until after a surge has disappeared.

9. A surge protection circuit, comprising in combination:
   a pair of input leads;
   a FET connected to open and close one of said leads;
   a terminal for supplying operating voltage to said FET;
   a first circuit and a second circuit;
   a flip-flop circuit for activating said first circuit in one condition and said second circuit in its other condition;
   sensing means connected across said leads for activating said flip-flop circuit to said one condition upon sensing a surge voltage;
   said first circuit preventing said FET from conducting current when said first circuit is activated; and,
   said second circuit resetting the flip-flop circuit after a predetermined time.

10. A surge protection method for a device connected across a pair of incoming lines comprising the steps of:
    disposing a FET in one of the incoming lines for opening and closing said line;

sensing a surge voltage;

preventing said FET from conducting current when said surge is sensed; and maintaining the preventing until the surge has passed.

11. The method of claim 10, wherein:

clamping the gate of said FET to ground to prevent charge buildup on the gate in the event the surge occurs while said FET is non-conducting or conducting.

12. The method of claim 11, wherein:

providing a discharge path for energy passing through said FET as it is turned from ON to OFF.

13. The method of claim 10, wherein:

enabling a stray capacitance discharge path when said surge is sensed including the FET capacitance.

* * * * *

UNITED STATES PATENT AND TRADEMARK OFFICE
CERTIFICATE OF CORRECTION

PATENT NO. : 5,315,651
DATED : May 24, 1994
INVENTOR(S) : Rahamim et al.

It is certified that error appears in the above-identified patent and that said Letters Patent is hereby corrected as shown below:

Title page, item [22] should read:

-- Jun. 9, 1992 --

Signed and Sealed this

Twentieth Day of December, 1994

Attest:

BRUCE LEHMAN

*Attesting Officer*   *Commissioner of Patents and Trademarks*